US006269764B1

(12) United States Patent
Adamy et al.

(10) Patent No.: US 6,269,764 B1
(45) Date of Patent: Aug. 7, 2001

(54) TIMING DEVICE

(75) Inventors: Steven T. Adamy, Hamilton; Francis R. Cala, Highland Park, both of NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 0 days.

(21) Appl. No.: 09/311,949

(22) Filed: May 14, 1999

(51) Int. Cl.[7] .................................................... G01N 31/22

(52) U.S. Cl. .......................... 116/206; 116/200; 368/327; 426/87

(58) Field of Search .................................... 116/206, 207, 116/216, 219, 200; 368/327; 426/87, 88; 374/102, 104, 106, 107, 108

(56) References Cited

U.S. PATENT DOCUMENTS

| | | |
|---|---|---|
| 2,560,537 | 7/1951 | Andersen . |
| 2,671,028 | 3/1954 | Clark . |
| 3,242,733 | 3/1966 | Johnson . |
| 3,414,415 | 12/1968 | Broad, Jr. . |
| 3,479,877 | 11/1969 | Allen et al. . |
| 3,751,382 | 8/1973 | Ljungberg et al. . |
| 3,768,976 | 10/1973 | Hu et al. . |
| 3,942,467 | 3/1976 | Witonsky . |
| 3,951,098 | 4/1976 | Meyers . |
| 3,996,007 | 12/1976 | Fang et al. . |
| 4,028,876 | 6/1977 | Delatorre . |
| 4,408,557 | 10/1983 | Bradley et al. . |
| 5,602,804 | 2/1997 | Haas . |

*Primary Examiner*—Andrew H. Hirshfeld
(74) *Attorney, Agent, or Firm*—Irving M. Fishman

(57) ABSTRACT

A timing device for visually determining the passage of a preselected period of time including an inverted U-shaped tube having opposed ends with at least one of the opposed ends having a reservoir for storing a reactant or an indicator, transport means extending from the reservoir to the other of the opposed ends of the tube for transporting at least one of the reactant or the indicator until they contact each other, a reactant, and an indicator which when in contact with the reactant via the transport means emits an observable change in a property wherein the minimum length of the period of time corresponds to the time it takes for the reactant and indicator to contact each other.

33 Claims, 5 Drawing Sheets

TIMING DEVICE

FIELD OF THE INVENTION

The present invention is generally directed to a timing device for visually determining the passage of a preselected period of time which is applicable to a wide variety of consumer products, especially for products which have an extended shelf or use life and for which it is desirable to know when the product must be replaced or rejuvenated. The timing device can be attached to or incorporated in typical packaging employed for consumer products.

BACKGROUND OF THE INVENTION

Consumer products including food products, cleaning products, deodorizers and the like have a shelf life determined by the length of time the components of the product resist change to environmental influences. For example, food products have a given shelf life based on their ability to resist chemical or physical changes due to contact with air, heat and other influences in the environment. Many consumer products are date stamped to provide the user with an indication of the shelf life of the product. The shelf life may be relatively short such as a few days or may be relatively lengthy such as a few months. Date stamping of consumer products provides the user with some indication when the product may no longer be useful for its intended purpose.

Quite often, date stamps are printed inconspicuously on the product package. It is sometimes difficult to read the date stamp and in some cases even to find the date stamp because it may be printed anywhere on the package. Date stamping is particularly problematic for products which have a relatively long shelf life because such products tend to get stored in an obscure recesses of a storage area, such as a food cabinet or refrigerator. If the product is not used often, the consumer is often unaware that the expiration date is shortly forthcoming or has even passed.

There have been attempts to provide a visible indication of when the useful life of a product has expired. So called "life time indicators" are employed for food products such as disclosed in U.S. Pat. Nos. 2,671,028; 3,751,382; and 3,942,467. These indicators typically work through chemical reactions initiated or increased in rate by exposure to high temperatures. Other lifetime indicators rely on diffusion of a component through a traditional wick or membrane as disclosed in U.S. Pat. Nos. 3,414,415; 3,479,877 and 3,768,976, each of which is incorporated herein by reference.

Examples of such products include, for example, the Oral-B toothbrush indicator which is based on the diffusion of a dye out of the bristles. When the color of a select group of bristles disappears, the user is aware that the toothbrush may or should be discarded and replaced. Another example is the Glade Neutralizer which is a deodorizer product having a timer based on the evaporation of a solvent from a polymer gel and subsequent shrinkage of the gel.

The timing indicators mentioned above suffer from one or more disadvantages which makes their universal applicability to a wide range of packaged products problematical. Such disadvantages include a) the timing mechanism is part of the product (e.g. a deodorizer) and is therefore limited to employment with that product or that class of products, b) the timing mechanism is inaccurate or cannot be controlled to accommodate a wide range of product shelf lives, c) the timing mechanism is expensive and/or d) has a limited range of measurement.

It would therefore be an advance in the art of providing visible indicators for determining when a product should be replaced or rejuvenated if a cost efficient and effective shelf life indicator could be provided which provides a clear and distinct visible indication of when a product should be replaced or rejuvenated. It would be a further advance in the art if a shelf life indicator could be provided which enables the consumer to see how much time is remaining for the shelf life of the product which indication is accurate and clearly visible.

SUMMARY OF THE INVENTION

The present invention is generally directed to a shelf life indicator hereinafter referred to as a "timing device" for determining the remaining shelf life of a product and visually displaying the same which has applicability to a wide range of consumer products and packages containing the same. The timing device can be applied to products which have a relatively short shelf life (e.g. dairy products including milk) and products which have a fairly long shelf life such as canned vegetables.

In a particular aspect of the present invention, there is provided a timing device for determining and visually displaying the passage of a preselected period of time comprising:

a) an inverted U-shaped tube having opposed ends with at least one of the opposed ends having a reservoir for storing a reactant or an indicator;

b) transport means extending from the reservoir to the other of the opposed ends of the tube for transporting at least one of the reactant or the indicator until they to contact each other;

c) a reactant; and d) an indicator which when in contact with the reactant via the transport means emits an observable change in a property wherein the minimal length of the period of time corresponds to the time it takes for the reactant and indicator to contact each other.

Methods of employing the device, packages employing the device and methods of manufacturing the device also constitute a part of the invention set forth herein.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

The present invention is generally directed to a timing device for visually determining the passage of a preselected period of time in which the timing device has particular applicability to visually indicating the remaining shelf life of a product, especially consumer products such as food products and household products. The main component of the timing device is an inverted U-shaped tube which contains two components, a reactant and an indicator as more fully described hereinafter. Contact of the reactant and indicator directly or indirectly produces a visible change in at least one property, preferably a color change which can indicate that the product should be replaced or rejuvenated, the amount of time which has passed since the product was used, and/or the amount of time remaining before the product must be replaced or rejuvenated. Of particular importance to the present invention is the manner in which the reactant and indicator come into contact with each other. Control over when the reactant and indicator come into contact and where in the timing device they come into contact provides the timing device with the means by which the above-mentioned time periods can be realized.

Figure 1:
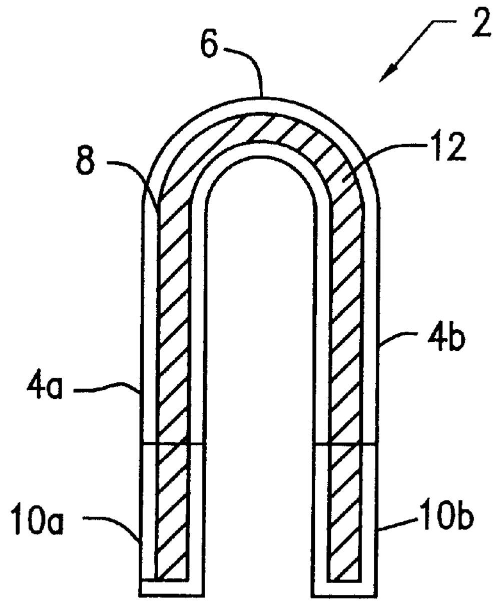
FIG. 1 is a front elevational view of a first embodiment of the inverted U-shaped tube which is employed as part of the timing device of the present invention.

A first embodiment of the inverted U-shaped tube is shown in FIG. 1. The inverted U-shaped tube 2 (hereinafter "Tube") is comprised of a pair of spaced apart and parallel leg portions 4*a* and 4*b* connected to each other through a curvilinear central portion 6. The opposed leg portions 4*a* and 4*b* and the central portion 6 thereby define a continuous passageway 8.

Each of the leg portions 4*a* and 4*b* have a corresponding reservoir 10*a* and 10*b* at the respective ends of the leg portions 4*a* and 4*b*. At least one of the reservoirs will contain a reactant and the other of the reservoirs may contain an indicator as explained in more detail hereinafter.

In one embodiment of the invention, the reactant is contained within one of the reservoirs and the indicator is contained within the other of the reservoirs 10*a* and 10*b*. In accordance with the present invention, there is provided a means for transporting at least one of the reactant and the indicator so that they may contact each other and thereby cause a visible change in property (e.g. a color change) which is an indication of the passage of time corresponding to all or a portion of the shelf life of a product.

The preferred transportation means represented by 12 in FIG. 1 is a porous material, most preferably a wicking material which can absorb the reactant and/or the indicator and allow the reactant and/or indicator to pass therethrough.

The preferred wicking materials are those selected from the group consisting of woven fabrics, non-woven fabrics and combinations thereof. What is particularly important for the wicking material is to enable the reactant and/or indicator to move therethrough and travel at least a portion of the distance from one reservoir to another. The distance of travel must be sufficient to enable the reactant and indicator to contact each other and thereby react producing a visible change in a property such as a color change.

The time it takes for a liquid to pass through a wicking material is dependent on how well the liquid wets the material. The employment of polar liquids and wicking materials of lower polarity generally result in longer wicking times. Polar liquids and polar wicking materials generally result in a timing device where the passage of the liquid is more rapid (i.e. shorter wicking times).

Specifically preferred wicking materials include polyesters, polyacrylates, polyacrylamides, polypropylene, polyethylene terephthalate and copolymers thereof, cellulosic materials (including but not limited to natural or synthetic cotton, wood, paper and cellulosic polymers), wool, fiberglass, silica gel, ceramics and combinations thereof.

Low polarity wicking materials include polypropylene and polyethylene terephthalate. Relatively high polarity wicking materials include paper, cotton, wool and silica gel. The polarity of the wicking material can be altered and hence the time of travel of the liquid therethrough by producing blends of low and high polarity wicking materials. An example of such a blend is the combination of polyethylene terephthalate and cotton which are typically made by cross linking the hydroxyl groups of the cotton with reactive functional groups of the polyethylene terephthalate.

The density of the wicking material may be a factor in controlling the rate of absorption of the reactant and/or indicator. Generally, the denser the wicking material, the slower the rate of adsorption. By selecting a suitable wicking material and density thereof, one is able to control the rate at which the reactant and/or indicator proceeds through the wicking material to enable the reactant and indicator to come into contact with each other and thereby cause a visible change in properties.

The physical structure of the wicking material also can influence the rate at which a fluid passes through the timing device. For example, fluid flow can be affected by the type of weave and whether the wicking material has a uniform profile (e.g. having a uniform circular cross-section) or has a non-uniform profile such as a corrugated structure or combinations thereof.

The Tube 2 as shown in FIG. 1 can be fabricated from any number of materials including plastics and glass. It is preferred that the material used to construct the Tube 2 be unbreakable to prevent injury to the consumer. Preferred materials are plastics including, for example, polyethylene and polyethylene terephthalate.

The Tube 2 must enable the user to observe a color change or other change of property that occurs within the tube. Thus, the term "clear" as used herein means that the Tube can be transparent or translucent, but not opaque. The Tube 2 itself may be colored so long as the color change taking place within the tube can be observed by the user.

The reactant and indicator may be selected from solids, liquids or gases so long as the reactant and indicator are able to contact each other. Liquid reactants and indicators are preferred because gaseous reactants and indicators tend to travel over a relatively short period of time because they more readily diffuse through the Tube 2 and are more difficult to control using the wicking material present therein. Where desirable, one, but not both of the indicator and reactant may be a solid.

The reactant and indicator are selected so that when in contact with each other there is a visible change of properties such as a color change. The reactant can be selected from acids, bases, oxidizing agents and reducing agents. The indicators are those materials which when in contact with the reactant cause the change in properties which are visible to the user. For example, indicators include litmus compounds, methyl orange, bromocresol green and congo red.

The change in property which results in a change observable by the user may be from the direct interaction of the indicator and reactant or through an intermediary substance. Direct interaction indicators are those which change color through direct contact with the reactant. Examples of direct indicators are so-called redox indicators such as thymolindolphenol and neutral red. Thymolindolphenol is colorless in its reduced form. Upon contact with a suitable oxidizing agent (e.g. $Fe^{+3}$), thymolindolphenol is oxidized and thereby turns blue.

Neural red is likewise colorless in reduced form. When oxidized in the presence of a suitable oxidizing agent, neutral red turns red. Other redox reactions may be employed to effect a visible color change including the conversion of $CrO_2^-$ (green) to $CrO_4^{-2}$ (yellow).

The above-mentioned redox systems are examples of direct interaction systems. Such systems produce a change of property by direct reaction of the reactant and indicator.

In some reactant-indicator systems, it is possible to extend the time before the reactant and indicator react to produce a change of property by employing a scavenger for one of them. For example, a reactant ($Fe^{+3}$), scavenger ($Cu^{+1}$) and indicator (e.g. thymolindolphenol) are contained within the timing device. Before the indicator can undergo a color change, the reactant first reacts with the scavenger. Alternatively, another method of obtaining a further delay is to initiate a series of reactions such that a first reactant and a co-reactant produce a first intermediate. The first intermediate can either react with the indicator or with a second co-reactant to produce second intermediate which second intermediate reacts with the indicator to produce a color change. Any number of intermediary reactions and intermediates may be employed as desired.

Other reactant-indicator pairs and scavengers used therewith are known and available such as the employment of a system including $Ti^{+2}$ (indicator), $Fe^{+3}$ (scavenger) and neutral red (indicator).

In another reactant-indicator system, the reactant may be water which induces a color change from a reactant which is an anhydrous compound. For example, cobalt chloride is an anhydrous compound which is blue. Upon contact with water (reactant), the cobalt chloride converts to the hydrated form which has a pink color. Other anhydrous compounds which are suitable for use in the present invention would be known to those of ordinary skill in the art.

In the embodiment shown specifically in FIG. 1, there is employed two reservoirs 10*a* and 10*b*. The reactant may be contained in the reservoir 10*a* and the indicator may be contained in the reservoir 10*b*. The wicking material 12 is contained within the passageway 8 extending from the reservoir 10*a* to the reservoir 10*b*. The selection of a suitable wicking material will enable at least one of the reactant and indicator to travel up the wicking material until the reactant contacts the indicator. If both the reactant and indicator travel through the wicking material, they will meet at some location in the wicking material depending on the relative rates of absorption of the reactant and indicator. Thus, the visible color change will take place at some point along the wicking material and the time it takes for that visible color change to take place is the period of time coinciding with the desirable shelf life of the product. If desired, a portion of the tube may be opaque or hidden so that a visible window area is present at a different location than where the reactant and indicator initially react. If the indicator is not absorbed by the wicking material then the color change will take place in the reservoir 10*b* after the reactant has traveled the full distance through the wicking material from the reservoir 10*a* and to the reservoir 10*b*.

For longer periods of time, the reactant (which can be a solvent) may be a liquid or in solution and the indicator may be solid. The tube is opaque except for a window. The liquid traverses the tube to reach the solid indicator, dissolves the indicator, and draws the dissolved indicator back along the wicking material until the window portion of the tube is reached and a visual observation can be made.

The employment of a reactant and indicator pair provides a fixed period of time before a color change takes place depending on the type and density of the wicking material. Quite often, it is desirable to modify the rate at which the reactant and/or the indicator travel through the wicking material in order to provide a longer or shorter shelf life measurement which may be accomplished by adding a viscosity modifying agent. The employment of a viscosity modifying agent is dependent in part on the recognition that when the reactants and/or indicators are liquids they typically move through the wicking material in opposite directions which will impede the forward progress of each flow. Furthermore, the viscosity of the reactant and/or indicator will have an effect on the rate of movement of the same through the wicking material. As previously indicated if a modification of the rate of movement is desired a viscosity modifying agent may be used.

In accordance with the present invention, a viscosity modifying agent may be added either to the reactant or to the indicator or to both. The viscosity modifying agent, depending on its viscosity, can be used to speed up or slow down the rate of travel of the reactant and/or indicator. The slowing down of the travel time is desirable when the shelf life of the product is relatively long. The speeding up of the travel time is desirable for those products having a relatively short shelf life.

Viscosity modifying agents for use in the present invention are desirably compatible with the other components (i.e. reactants and indicators) in that they do not cause any change in the composition of the components or the manner in which they react with each other. Another desirable property of the viscosity modifying agents is that they are able to be absorbed and passed through the wicking material without adversely affecting the reactant and indicator. Still further, it is desirable that the viscosity modifying agent be nontoxic, particulary when associated with products used by consumers. Typical examples of viscosity modifying agents for use in the present invention include water, glycerine, alkylene glycols (e.g. propylene glycol) and combinations thereof.

The amount of the reactant, indicator, and optional viscosity modifying agent will vary. The amounts selected for each of the components are made to ensure a visible change in property after a desirable preselected period of time (i.e. the length of the time of the shelf life of the product). The amount of each of these components should be sufficient to travel through the wicking material for the estimated distance of travel to have contact of the reactant and indicator.

This represents a minimum amount of the components to achieve the desired time period measurement. More than the minimum amount of each component can be used to ensure a proper reaction at a desirable location within the timing device. Generally, the amount of the reactant is at least 0.01% by weight and most typically from about 0.01 to 5.0% by weight, based on the total weight of the materials of the reactant solution. The amount of the indicator is typically at least 0.01% by weight, most typically within the range of from about 0.01 to 0.5% by weight and the amount of the viscosity modifying agent, if necessary, may approach 100% by weight of the indicator and/or reactant solution and is typically in the range of from about 25 to 75% by weight based on the weight of the respective solution.

Figure 2:
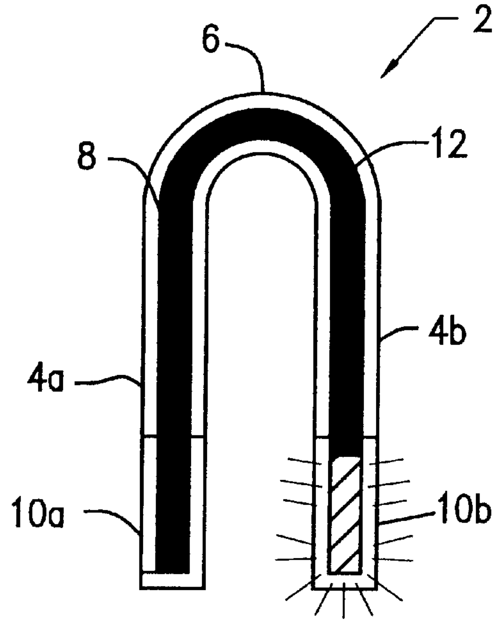
FIG. 2 is a front elevational view of the embodiment shown in FIG. 1 showing contact of the reactant and indicator.

In one embodiment of the invention, as previously described and as shown in connection with FIG. 2, the reactant contained within a reservoir (e.g. 10*a*) travels the entire length of the wick until it reaches the reservoir (e.g. 10*b*) containing the indicator at which time a color change occurs. The time it takes for the reactant to travel through the wick and into the reservoir 10*b* containing the indicator corresponds to the desired shelf life of the product and when the color change occurs the user knows that the product should be discarded or rejuvenated. In special "window" embodiments, the time period and the initial reaction time are not the same; rather the desired time period is for a color change to occur at a particular location along the inverted "U"-shaped tube.

Figure 3:
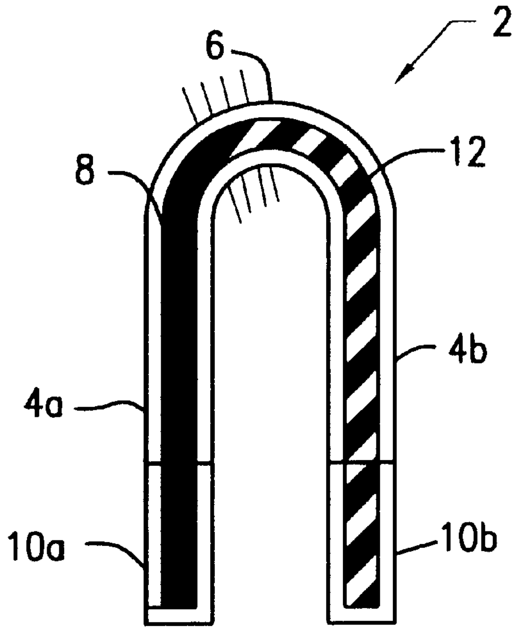
FIG. 3 is a front elevational view of the embodiment of FIG. 1 with contact of the reactant and indicator occurring between the respective reservoirs.

In another embodiment of the invention as shown in FIG. 3 both the reactant contained in the reservoir 10*a* and the indicator contained in the reservoir 10*b* travel through the wicking material and eventually contact each other at some point within the passageway 8 of the device 2. By suitably selecting reactants and indicators as well as the type and density of the wicking material, and optionally a viscosity modifying agent, the point of contact of the reagent and indicator and their time of travel can be accurately predicted and controlled. As shown specifically in FIG. 3, the point of contact of the reactant and indicator is about midway of the total length of the passageway and when a color change is observed at the point of contact, the product should be discarded or rejuvenated by the user. Where desired, time periods corresponding to periods other than the initial contact point between the reactant and the indicator may also be selected by utilizing a substantially opaque tube and a window enabling visible observations at a preselected position along the tube. The desired time period would then correspond to a visible color change visible in the "window" region of the tube.

The embodiments of the present invention as described in connection with FIGS. 1–3 provide for the movement of the reactant alone or the movement of both the reactant and the indicator through the wicking material and eventual contact causing a visible color change. It will be understood that in accordance with the present invention, the reactant may remain within the reservoir 10*a* while the indicator moves from the reservoir 10*b* through the wicking material over the entire length of the passageway 8 into the reservoir 10*a* where a reaction occurs causing a color change. In all of these embodiments (FIGS. 1–3) the occurrence of a color change coincides with the useful shelf life of the product. When the color change occurs, the product is discarded or rejuvenated.

Figure 4:
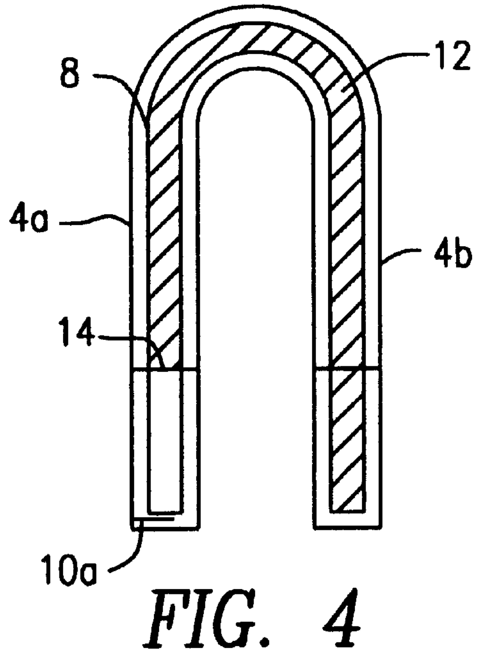
FIG. 4 is a front elevational view of another embodiment of the invention in which the wicking material is impregnated with an indicator.
Figure 5:
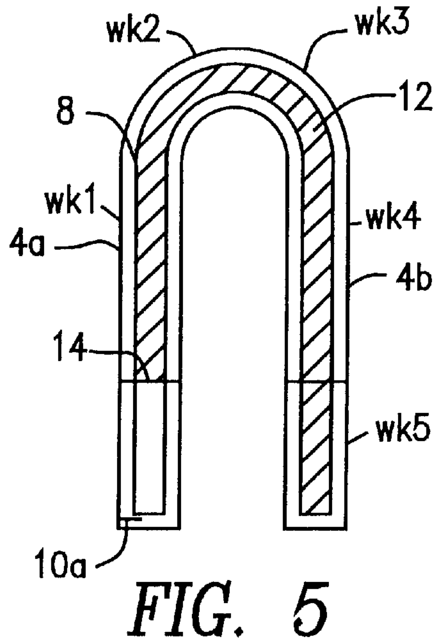
FIG. 5 is a front elevational view similar to FIG. 4 in which the timing device is marked with the indicia indicating the incremental passage of time.

However, the present invention is applicable to the employment of a color change as a continuous indication of the passage of time so that the user can readily identify how much time has passed since the product has been used and how much time remains until the product must be discarded. In this embodiment of the invention, it is desirable to place either the reactant or the indicator throughout the wicking material and let the other of the reactant and indicator be absorbed through the wicking material from one of the reservoirs causing a continuous color change from one reservoir to the other. Referring to FIGS. 4 and 5, there is shown the device 2 of the present invention having a wicking material 12 extending from one leg portion 4*a* to the other leg portion 4*b*. Within the reservoir 10*a* is, for example, a reactant. The wicking material 12 is impregnated with one of the reactant or indicator (e.g. the indicator). The wicking material 12 has the indicator impregnated therein from just above the reservoir 10*a* containing the reactant all the way to the opposed end of the timing device 2. As the reactant is absorbed by the wicking material, the reactant contacts the indicator imbedded in the wicking material at a point 14 lying just above the reservoir 10*a*. As the reactant continues to move through the wicking material, a simultaneous color change occurs because of the continuous contact of the reactant and the indicator. Thus, the embodiment of FIG. 4 measures the product life from the time of its use until the passage of a time period corresponding to the useful shelf life of the product.

As specifically shown in FIG. 5 the embodiment of FIG. 4 can be employed to measure the passage of time and provide the user with the remaining shelf life of the product.

For example, if a product has a useful shelf life of approximately five weeks, the timing device of the present invention based on the embodiment shown in FIG. 4 may be constructed as shown in FIG. 5. The timing device may be marked with weeks 1–5 (i.e. wk1=the first week; wk2=the second week, etc). Thus, as the color change commences from point 14 (the beginning of use of the product) and passes from point 14 to the marker indicating week one (wk1) the user will know that one week has passed since the product was used and about four weeks remain before the product must be discarded. It will be understood that the timing device can be constructed so that longer or shorter periods of time may be indicated depending on the type of reactant and indicator, the type and density of the wicking material, and the optional use of a viscosity modifying agent.

Figure 6:
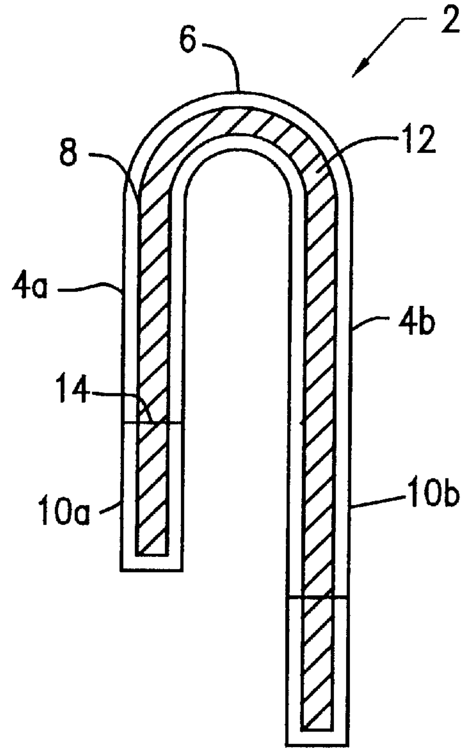
FIG. 6 is a front elevational view of another embodiment of the invention in which one of the legs of the timing device is longer than the other of the legs.

In a preferred embodiment of the present invention, one of the reservoirs lies below the plane of the other of the reservoirs. This system provides more efficient travel of the reactant or indicator and a more accurate indication of the shelf life of the product. Referring to FIG. 6, the timing device 2 has one of the leg portions 4*a* shorter than the other of the leg portions 4*b* so that the reservoir 10*a* lies completely above the reservoir 10*b*. Thus, the reactant contained in reservoir 10*a* has a shorter distance to travel to pass through the leg portion 4*a* into the leg portion 4*b* than in the embodiments shown in FIGS. 1–5. The difference in length of the two legs, "delta", is one factor controlling the efficiency of the transfer of fluid from one leg to the other. By increasing delta either by increasing the downward leg length 4*a* or by shortening the upward leg length 4*b*, or both, the siphoning effect, and hence the efficiency of the movement of liquid from 10*a* to 10*b* is enhanced.

The timing device of the present invention can be contained within a packaging or housing which has one or more ports or windows that enables the user to view the device to observe a color change at one or more locations.

Figure 7:
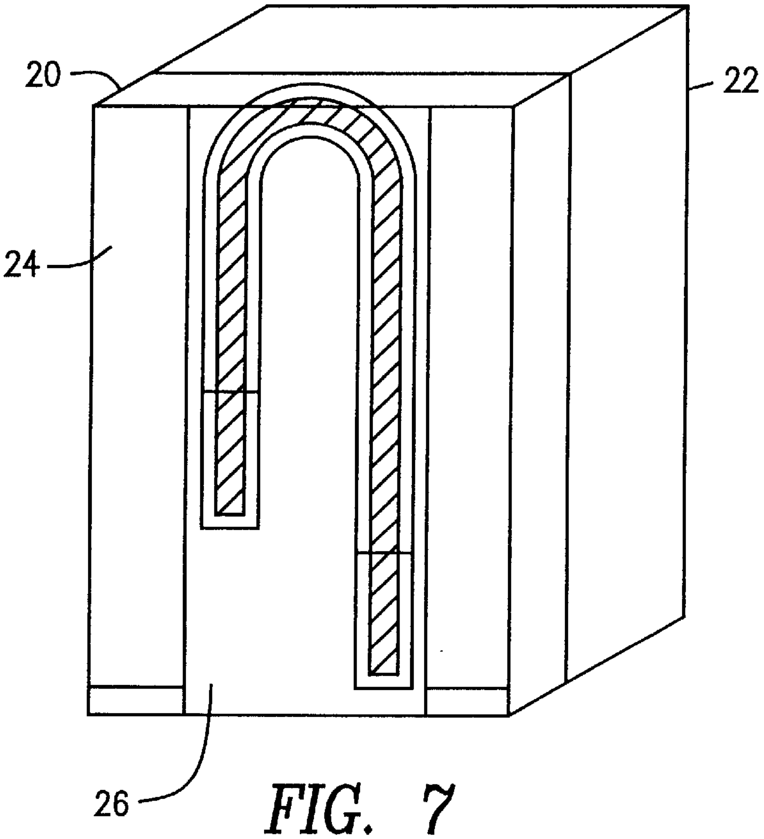
FIG. 7 is a perspective view of the timing device of FIG. 6 contained with a product package with the entire timing device visible.

Referring to FIG. 7, there is shown an embodiment of the timing device shown in FIGS. 5 and 6 contained within a housing 20 of a package 22 which contains a consumer product. The housing 20 provides sufficient space to house the timing device 2. The housing 20 has a front face 24 with a clear window 26 enabling the viewer to view the entire timing device 2. In this embodiment of the invention, the user can view the entire timing device 2 as discussed above in connection with FIGS. 1–5. Thus, all color changes and the location of all color changes can be observed by the user.

Figure 8:
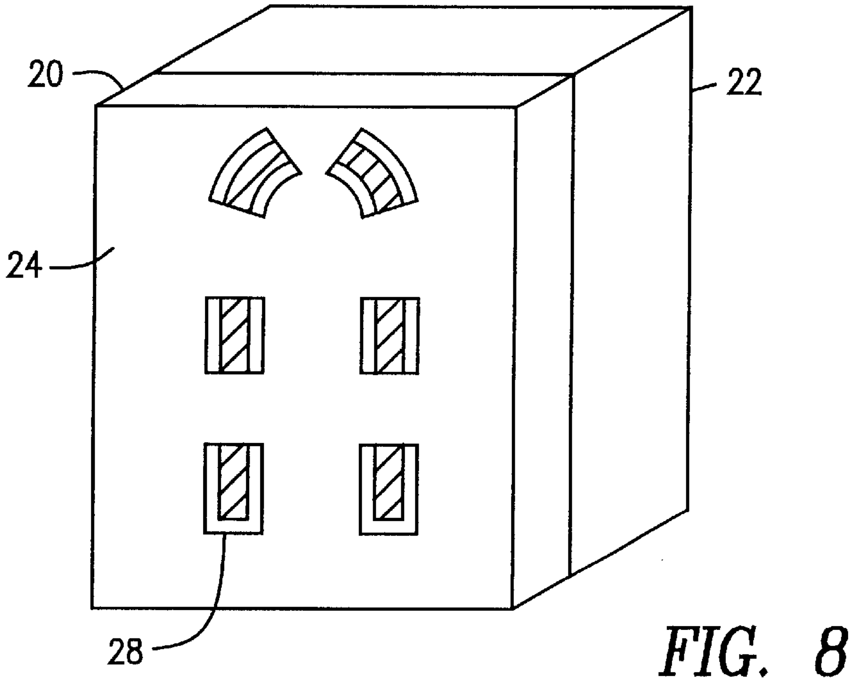
FIG. 8 is a perspective view of the timing device of FIG. 6 contained with a product package with spaced apart portions of the timing device visible.

In another embodiment of the invention as shown in FIG. 8, the package 22 may be provided with a housing 20 in which the front face 24 contains one or more ports or windows 28 which shows periodic color changes through the window indicating the passage of a fixed period of time such as one week or one month. If only one window is used, it should be at the point that there is a final color change indicating that the product needs to be replaced or rejuvenated. The employment of multiple windows 28 enables the user to periodically observe how much time has passed and how much time remains of the product shelf life. In the specific embodiment of FIG. 8, there are six windows with the first two windows indicating a color change. If each window was indicative of the passage of one week of time, then the product would have been used for two weeks with about four weeks remaining of the product shelf life.

The timing device 2 of the present invention can be affixed to a product by adhesive or the like or can become prepackaged with the product as indicated in the embodiments of FIGS. 7 and 8. In some cases, it is desirable to package the reactant and indicators in the respective reservoirs within a breakable container which can be broken by pressure applied to the user. Such containers include capsules made of a variety of materials including gelatins and the like. The breakable capsules enable the user to commence the start of the product life and thereby disregard that the period of time from manufacture to purchase by the user.

The wicking material employed in the timing device of the present invention may be arranged in a uniform profile or a non-uniform profile. The term "uniform profile" shall mean that the cross-sectional area and shape of the wicking material is the same throughout the length thereof. The term "non-uniform profile" shall mean that the cross-sectional area and shape of the wicking material is not the same throughout the length thereof.

Figure 9A:
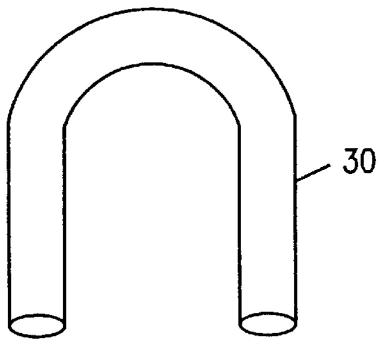
FIG. 9A is a side view of a portion of a timing device containing a wicking material with a uniform profile.
Figure 9B:
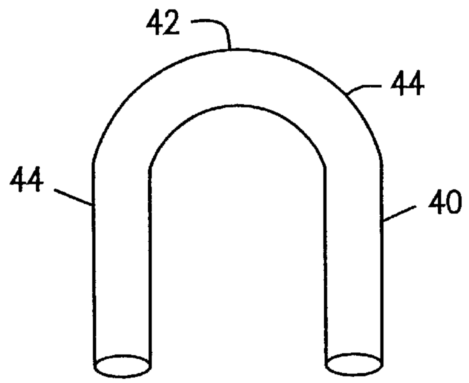
FIG. 9B is a side view similar to FIG. 9A with the wicking material having a non-uniform profile.

Referring to FIG. 9A there is shown a uniform profile wicking material 30 having a uniform diameter and shape throughout the length of the wicking material. FIG. 9B shows a non-uniform profile in which the wicking material 40 has a center portion 42 having a smaller cross-sectional area than the opposed legs 44 thereof.

Figure 9C:
FIG. 9C is a side view of another embodiment of a wicking material having a non-uniform profile.

In another embodiment of a non-uniform profile, the wicking material may have a corrugated profile. Referring to FIG. 9C the wicking material 50 includes a series of peaks 52 and valleys 54 so that at any one location the cross-sectional area and/or shape is different from another location along the length thereof.

Figure 10:
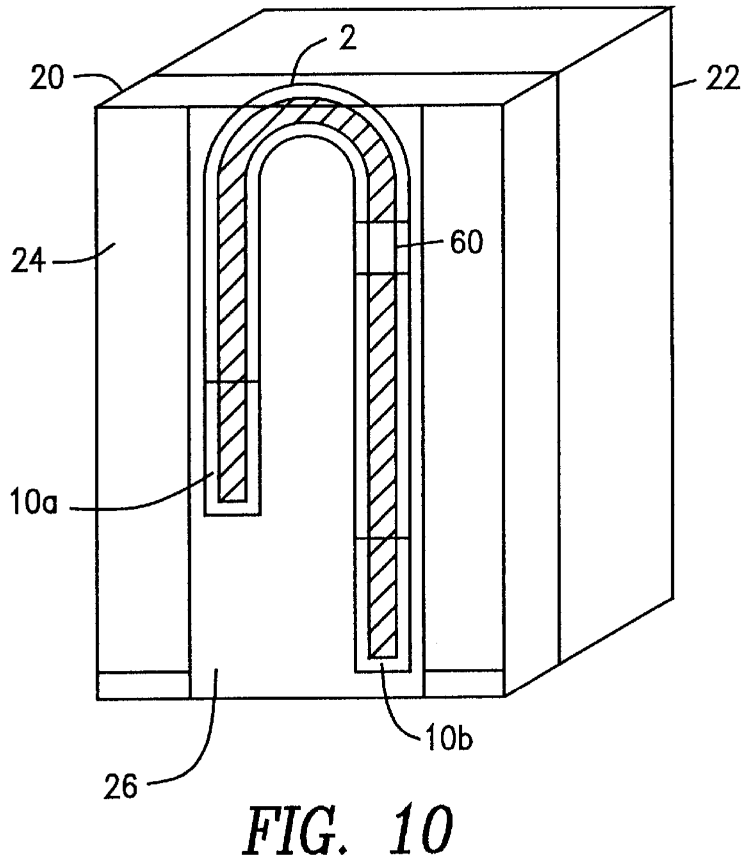
FIG. 10 is an embodiment of the timing device of the present invention employing a solid reactant or indicator.

As previously indicated the timing device may employ a reactant or indicator which is comprised of a solid material. One such embodiment is shown in FIG. 10. Referring to FIG. 10, a timing device 2 is packaged in a manner similar to the embodiment shown in FIG. 7. In particular, the package 22 has a front face 24 which can expose all or part of the timing device 2 through a window 26. A reservoir 10*b* contains a solid indicator (e.g. cobalt chloride) while a reservoir 10*a* contains a liquid reactant (e.g. water). Water travels from the reservoir 10*a* to the reservoir 10*b* to cause a color change (e.g. from blue to pink) which is observable through the window 26.

The time for a color change to occur in the embodiment shown in FIG. 10 will in part be dependent on the time it takes the reactant (e.g. water) to reach the solid indicator (e.g. cobalt chloride). It will be observed that contact of the liquid reactant and solid indicator will result in the formation of a solution in the reservoir 10*b*. Due to capillary action, and concentration gradients, the solution (which will have a pink color in the example mentioned above) will migrate toward the reservoir 10*a*. As a consequence, it is possible to place a window along the path of the wicking material to observe the "pink" colored solution. Such a window is shown in FIG. 10 by numeral 60. Thus the length of the period of time can be extended because the liquid indicator must first travel from reservoir 10*b* to 10*a* to cause a color change therein and then for an additional period of time until the colored solution in the reservoir 10*a* reaches the window 60 where it is observed by the consumer. Alternatively, solid indicator may be placed in reservoir 10*b* and liquid reactant may be placed in reservoir 10*a*.

EXAMPLE 1

A timing device of the type shown in FIG. 6 was constructed by inserting into a U-shaped tube. Grade 3 chromatographic paper obtained from Whatman, Inc. of Clifton, N.J. may serve as the wicking material. Reservoirs were made from the bulbs of 3 ml disposable pipettes obtained from Becton Dickinson Co. of Franklin Lakes, N.J.

A reactant solution was prepared by combining 9.80 weight % of deionized water, 88.24 weight % of glycerine and 1.96 weight % of glacial acetic acid. An indicator solution was prepared by combining 10 weight % of deionized water, 89.95 weight % of glycerine and 0.05 weight % of litmus. The reactant solution was clear while the indicator solution was blue.

In order to activate the timing mechanism, 1.5 ml of the indicator solution was placed in the indicator reservoir and 1.5 ml of the acidic solution was placed in the reactant reservoir. The U-shaped wick was then placed in the reservoirs until each end of the wick touched the bottom of the reservoirs. The entire assembly was then wrapped in a covering of plastic film.

The timer duration was noted as the time it took the indicator reservoir to turn from blue to red. Multiple samples were tested in this matter at ambient temperature (typically at 68–70° F.) or in a thermostatic chamber which maintained a constant temperature of 80° F. and a relative humidity of 80%. The results are shown in Table 1.

TABLE 1

| Samples | Duration (Room Temp.) | Duration (80 ° F./80% RH) |
|---|---|---|
| Group I | 42 ± 2 days | 36 ± 2 days |
| Group II | 38 ± 2 days | 35 ± 2 days |

As shown in Table 1, the duration of the respective samples at room temperature was fairly consistent and provided a fairly accurate means of measuring shelf life of the product. It was noted that when the temperature and relative humidity increased significantly, there was a reduction in the time it took for the reactant to contact the indicator.

EXAMPLE 2

A timing device of the type shown in FIG. 6 using Whatman Grade 17 chromatography paper was employed to measure the effective life of a box of baking soda used as a deodorizer within a cool environment such as maybe found in a refrigerator or freezer.

An indicator solution was prepared containing 7.50% by weight of deionized water, 67.47% by weight of glycerine, 24.98 weight % of propylene glycol and 0.05 weight % litmus. A reactant solution was prepared containing 7.35 weight % of deionized water, 66.18 weight % of glycerine, 24.51 weight % of propylene glycol and 1.96 weight % of glacial acidic acid. Several samples of the timing device of the type shown in FIG. 6 were combined with the above-mentioned reactant and indicator solutions and tested in a refrigerator at 40° F. The timing device showed an average life of 80±4 days.

EXAMPLE 3

The process of Example 2 was repeated except that the indicator solution contained 7.49 weight % of deionized water, 67.43 weight % of glycerine, 24.9 weight % of propylene glycol and 0.10 weight % litmus. The reactant solution remained the same as in Example 2. This system was tested in the same manner as in Example 2 and the duration of the timing device samples averaged 92±4 days.

What is claimed is:

1. A timing device for visually determining the passage of a preselected period of time comprising:

(a) an inverted U-shaped tube comprising a central portion and a pair of legs extending downwardly from the central portion, one of said legs having a greater length than the other of said legs, each of said legs having an end with a reservoir located in at least one of said ends and said ends being spaced apart from each other;

(b) transport means within the inverted U-shaped tube extending from the reservoir to the other end of the tube;

(c) a reactant present in said tube; and (d) an indicator present in said tube such that prior to the initiation of the preselected period of time the reactant and indicator are not in contact with each other, wherein when the reactant and indicator come in contact with each other as the result of one of said reactant and said indicator traveling along said transport means to the other of said reactant and said indicator, the indicator emits an observable change in a property wherein a minimum length of the preselected period of time corresponds to the time it takes for the reactant and indicator to contact each other and the indicator to emit said observable change in property.

2. The timing device of claim 1 wherein the reservoir in said one end is a first reservoir and the other of the ends has a second reservoir.

3. The timing device of claim 2 wherein the reactant is initially present in the first reservoir and the indicator is initially present in the second reservoir.

4. The timing device of claim 3 wherein each of said reactant and indicator is a liquid.

5. The timing device of claim 4 wherein the reactant is selected from the group consisting of an acid and a base.

6. The timing device of claim 5 wherein the indicator changes color when contacted by the reactant.

7. The timing device of claim 1 wherein at least one of said reactant and said indicator is a liquid.

8. The timing device of claim 1 wherein the indicator comprises a color changing compound and a first viscosity modifying agent.

9. The timing device of claim 8 wherein the reactant comprises a second viscosity modifying agent.

10. The timing device of claim 9 wherein the second viscosity modifying agent is selected from the group consisting of water, glycerine, alkylene glycols and combinations thereof.

11. The timing device of claim 9 wherein the first and second viscosity modifying agents are the same.

12. The timing device of claim 11 wherein the first viscosity modifying agent is selected from the group consisting of water, glycerine, alkylene glycols and combinations thereof.

13. The timing device of claim 1 wherein the transport means is comprised of a porous material.

14. The timing device of claim 1 wherein the transport means is comprised of a wicking material.

15. The timing device of claim 14 wherein the wicking material is selected from the group consisting of woven fabrics, non-woven fabrics and combinations thereof.

16. The timing device of claim 14 wherein the wicking material is selected from the group consisting of polyesters, polyacrylates, polyacrylamides, polypropylene and copolymers thereof, natural or synthetic cellulosic materials, wood, paper, cellulosic polymers, cotton, wool, fiberglass, silica gel, ceramics and combinations thereof.

17. The timing of device of claim 14 wherein at least one of the reactant and indicator are present in the wicking material.

18. The timing device of claim 1 further comprising location means for identifying a location on the transport means where the observable change occurs corresponding to said preselected period of time.

19. The timing device of claim 1 wherein the indicator is an anhydrous compound and the reactant is water.

20. The timing device of claim 1 wherein the inverted U-shaped tube further comprises a scavenger material and wherein the reactant reacts with the scavenger material preferentially to prevent substantial reaction of the reactant with the indicator until the scavenger material is substantially consumed.

21. The timing device of claim 1 wherein the inverted U-shaped tube further comprises an intermediary substance wherein the reactant reacts with the intermediary substance to produce a second reactant which reacts with the indicator to produce said observable change of property.

22. The timing device of claim 1 wherein the reactant or indicator is a solid material.

23. The timing device of claim 22 wherein the other of said reactant or indicator is not a solid material and travels via the transport means to the solid material.

24. The timing device of claim 23 wherein the reactant and indicator contact each other to produce said change of property, said preselected period of time including the length of time it takes the non-solid material to travel a predetermined distance through the transport means.

25. A package having on an outer surface thereof a timing device for timing a preselected period of time corresponding to a product replacement period of time of a product contained with the package, said timing device comprising:

(a) an inverted U-shaped tube comprising a central portion and a pair of legs extending downwardly from the central portion, one of said legs having a greater length than the other of said legs, each of said legs having an end with a reservoir located in at least one of said ends and said ends being spaced apart from each other;

(b) transport means within the inverted U-shaped tube extending from the reservoir to the other end of the tube;

(c) a reactant present in said tube; and (d) an indicator present in said tube such that prior to the initiation of the preselected period of time the reactant and indicator are not in contact with each other, wherein when the reactant and indicator come in contact with each other, as the result of one of said reactant and said indicator traveling along said transport means to the other of said reactant and said indicator, the indicator emits an observable change in a property wherein a minimum length of the preselected period of time corresponds to the time it takes for the reactant and indicator to contact each other and the indicator to emit said observable change in property.

26. The package of claim 25 wherein the reservoir in said one end is a first reservoir and the other of said ends has a second reservoir.

27. The package of claim 26 wherein the reactant is initially present in the first reservoir and the indicator is present in the second reservoir.

28. The package of claim 27 further comprising location means for identifying a location on the transport means where the observable change occurs corresponding to said preselected period of time.

29. The package of claim 28 wherein the location means comprises at least one window.

30. A method of determining the passage of a preselected period of time corresponding to the useful life of a product comprising:

(a) attaching to said product or to a package containing said product a timing device comprising;

(1) an inverted U-shaped tube comprising a central portion and a pair of legs extending downwardly from the central portion, one of said legs having a greater length than the other of said legs, each of said legs having an end with a reservoir located in at least one of said ends and said ends being spaced apart from each other; and (2) transport means within the inverted U-shaped tube extending from the reservoir to the other end of the tube, (b) placing one of said reactant or indicator in the reservoir and the other of said reactant or indicator at the end remote from the reservoir;

(c) transporting at least one of the reactant or indicator along the transport means for a sufficient distance so that the reactant and indicator contact each other, and (d) observing a change in property of said indicator as a result of said contact as an indication of the passage of said preselected period of time.

31. The method of claim 30 comprising controlling the rate of flow of at least one of the reactant and indicator through the transport means.

32. The method of claim 30 comprising selecting a point on said transport means as a measure of the distance of travel of at least one of the reactant and indicator corresponding to the preselected period of time.

33. The method of claim 30 wherein the reactant and indicator are contained within separate breakable containers, said process further comprising breaking said containers to commence the preselected period of time.

* * * * *